April 27, 1954  G. A. McALISTER, JR  2,676,528
AIR CONDITIONER FOR AUTOMOTIVE VEHICLES
Filed Jan. 3, 1950  2 Sheets-Sheet 1
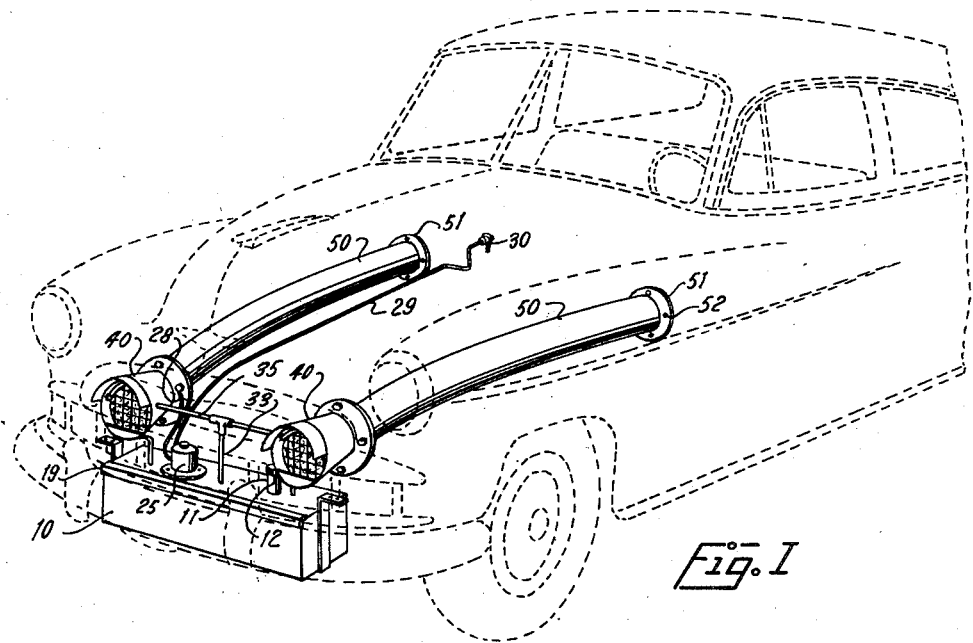
Fig. I
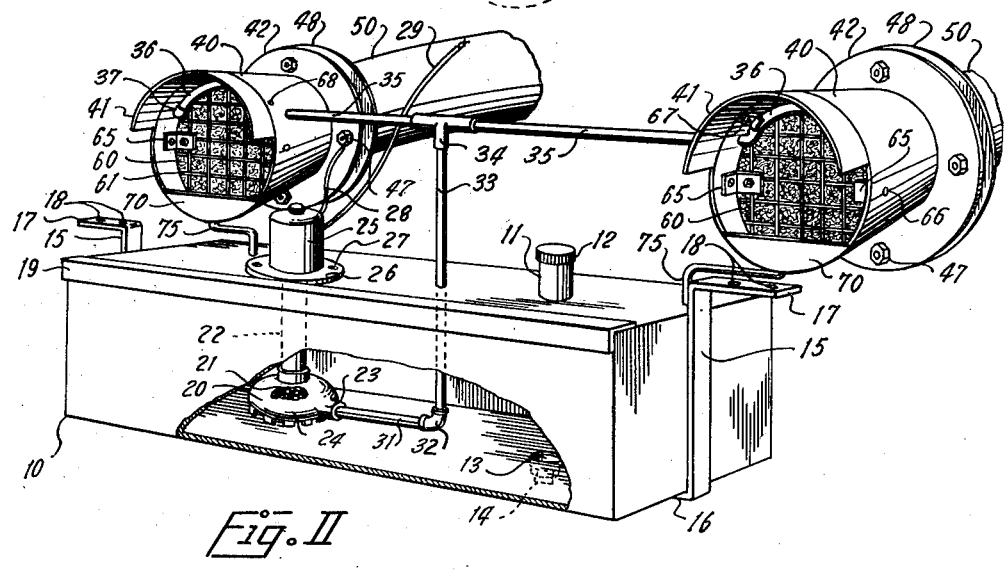
Fig. II
INVENTOR.
George A. McAlister, Jr.
BY
ATTORNEY April 27, 1954      G. A. McALISTER, JR      2,676,528
AIR CONDITIONER FOR AUTOMOTIVE VEHICLES
Filed Jan. 3, 1950      2 Sheets-Sheet 2
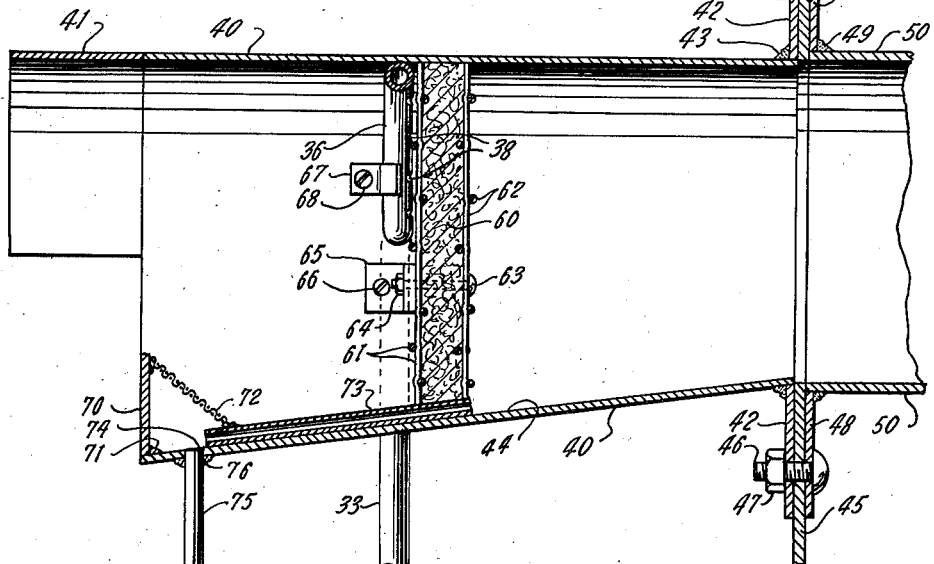
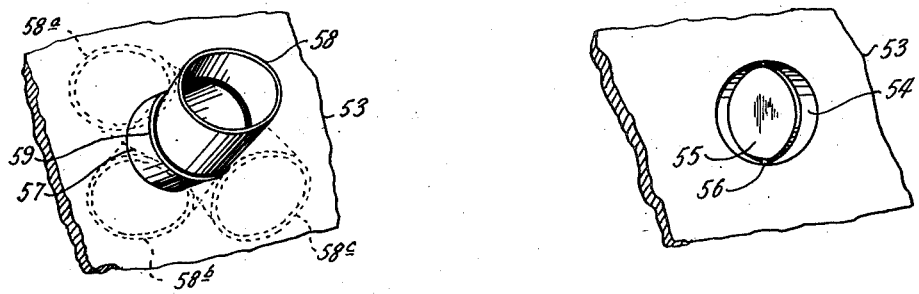
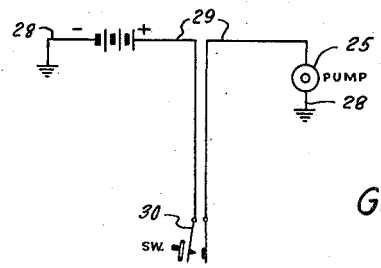
INVENTOR.
George A. McAlister, Jr.
ATTORNEY

Patented Apr. 27, 1954

2,676,528

UNITED STATES PATENT OFFICE 2,676,528

AIR CONDITIONER FOR AUTOMOTIVE VEHICLES

George A. McAlister, Jr., Big Spring, Tex., assignor of one-half to S. Austin Wier and Howard E. Moore Application January 3, 1950, Serial No. 136,479

4 Claims. (Cl. 98—2)

This invention is concerned with an air conditioner for automotive vehicles; and it is particularly concerned with an evaporative cooler and air conditioner adapted to be installed in an automobile.

Heretofore attempts have been made to air condition automobiles, and they have been generally unsatisfactory.

Coolers of evaporative type have been made and hung on the outside of the automobile door glass, so that air is forced through the device as the vehicle moves forward, evaporating water in the process and thereby cooling the air. These devices are of necessity relatively small and hold only a small quantity of water. They have to be filled very often, necessitating continued interruptions of the trip. These types of coolers also present an unsightly appearance, being hung on the exterior of the automobile. They are dangerous, cumbersome and obstructive of vision. They have very little cooling effect on the interior atmosphere of the automobile. The glass of the vehicle has to be lowered to receive air passing through the device, and hot air rushes in also.

Refrigerative air conditioners have been recently installed on automobiles, but such installation usually requires considerable physical change and alteration of the automobile frame and body. The mechanism for such air conditioner is ordinarily installed in the luggage compartment, reducing or employing all of the luggage space. Delicate equipment, such as a compressor, pressure regulator and thermal control apparatus are required; and such equipment cannot ordinarily long withstand the vibration and jolting of an automobile. Also, refrigerative air conditioning equipment is very expensive, necessitating the outlay of several hundred dollars in the initial cost of the equipment and its installation. Upkeep is quite costly. Such a device is ordinarily out of the price range of the average automobile owner.

I have devised an evaporative air cooler and conditioner for automobiles which is quite economical in initial cost, maintenance and operation, and it can be used in conjunction with ventilation air ducts already installed in late model automobiles, requires no physical alteration of the automobile, is completely concealed within the confines of the outer shell of the automobile, holds sufficient water to last for a relatively long trip without refilling, and positively furnishes sufficient cooled air to the interior of the automobile to allow for complete comfort of the occupants in hot weather. These attributes are not found in any prior automobile air cooler and conditioner.

Nearly all of the late model automobiles have a pair of ventilation air ducts thereon. The ducts ordinarily extend on either side of the engine with the front end thereof terminating inside of the front grill of the automobile and the rear end communicating with the interior of the vehicle, so that as the automobile moves forward, air enters the ventilation ducts and passes therethrough into the interior of the automobile.

It is intended that the present invention shall be employed in conjunction with these air ducts, thus taking advantage of standard equipment already installed on the car and cheapening the cost of the air conditioner.

However, it is to be understood that my air conditioner may be installed on any automobile, truck or bus, even though it is not originally provided with ventilation ducts. In the absence of such ducts it would simply be necessary to install them. In fact, my air conditioner may be adapted for use with any automotive vehicle. All component parts thereof may be made and sold for subsequent installation on the vehicle, or they may be made and installed at the factory.

Among the objects to be attained by my invention, in addition to the foregoing, may be found the following:

1. To provide a non-obstructing evaporative cooler to be attached to an automotive vehicle to cool its interior.

2. To provide a concealed evaporative cooler to be attached to and used in connection with ventilation ducts originally arranged in an automobile at the factory.

3. To provide an air scoop carrying an evaporator pad, and adapted to be attached to a ventilation duct built into an automobile at the motor factory.

4. To provide a removable evaporator pad for such scoop and/or such duct.

5. To provide a pressure free return conduit to return water from behind the evaporator pad to a water drain line in front of the evaporator pad.

6. To provide a visor or extension at the top of an air scoop to prevent the incoming air and water spray from going over the top of the scoop.

7. To provide a lip on the lower front of the air scoop, and extending thereacross, to collect water into the drain line leading from the scoop, and to also create a partial vacuum in the vicinity of the return conduit to draw excess water through such conduit and back into the drain to the storage tank.

8. To provide an air scoop which has a concave floor inclined toward the front of the scoop, so that water not evaporated is easily returned to storage through the return conduit and through the drain in the bottom of the scoop.

9. To provide an air scoop which has substantially the shape of a frustum of a cone having an over-hanging and outwardly extending visor so arranged as to collect a greater volume of air, especially from currents moving upwardly by reason of the rapid progress of the vehicle.

10. To provide an air scoop with a strainer therein arranged over the water drain to keep insects, trash and other foreign matter out of the water as it returns to the tank.

11. To provide an evaporative cooler for automobiles which recirculates and reuses the water whereby the wastage of water is eliminated.

12. To provide an automobile air conditioner which filters, washes, and strains all air passing into the car, thus cleaning it.

13. To provide an automobile air conditioner of the evaporative type wherein medicaments, inhalants, deodorants, and disinfectants may be added to the water therein for the purpose of disinfecting the interior of the car, providing pleasant odors, or providing ease in breathing by sufferers from hay fever, asthma, colds and other ailments.

14. To provide in such an automobile air conditioner means arranged at the delivery ends of the air ducts to so deflect the air passing therethrough as to allow choice of multiple directions.

15. To provide in such an automobile air conditioner means to control the amount of air passing through the ventilation ducts.

16. To provide in such an automobile air conditioner a variable speed switch whereby the pump or water circulator may be varied in speed, and whereby the amount of water delivered to the evaporator pads may be varied.

17. To provide an evaporative cooler for an automobile which is relatively inexpensive, light, simple and easy to install.

Other and further objects of my invention will become apparent upon reading the detailed specification hereinafter following. A preferred embodiment of my invention is shown in the drawings in which, Figure I is a perspective view of an automobile air conditioner, adapted to be attached to an automobile;

Figure II is an enlarged fragmentary perspective view of an automobile air conditioner, with the tank thereon partially cut away to show the impeller pump arranged within the tank;

Figure III is a cross-sectional side elevational view of an air scoop showing the evaporator pad, the dispersing pipe, the pressure-free return conduit, the air baffle and water retaining lip, the strainer and the water return line;

Figure IV is a perspective view of an adjustable extension on the ventilation duct communicating with the interior of the car, whereby air entering the automobile may be deflected in selected directions;

Figure V discloses an opening from the ventilation duct into the interior of the automobile, showing an adjustable butterfly louver therein, to control the amount of air entering the automobile; and Figure VI is a schematic drawing of a typical electrical circuit controlling the operation of the pump in my automobile air conditioner.

Numeral references are used to designate the various parts of my invention shown in the drawings, and like numerals are employed to designate like parts in the various views in the drawings.

The numeral 10 indicates the water storage tank, which is usually of sufficient length to extend between the main horizontal side frames of the automobile and of sufficient width to fit between the front grille and the radiator of the automobile.

As ordinarily employed the tank 10 holds about six gallons of water, which is a sufficient amount to permit the automobile to be driven approximately one hundred miles on a relatively hot day with the air conditioner in full operation without refilling. Of course, the amount of evaporation and the amount of water used in a given time will vary with the temperature and the humidity of the atmosphere and the speed at which the automobile is driven.

The tank 10 has a filler pipe 11, which filler pipe has a removable cap 12 thereon. The cap 12 could take the form of a cork inserted in the filler pipe 11. There is a drain opening 13 in the lower side of the tank 10, which opening is closed by the drain plug 14.

The hanger strap 15, which should have a horizontal portion 16 extending underneath the tank 10, is secured to the tank 10 by means of welds or other suitable attachment, and is for the purpose of supporting and suspending the water tank 10 between the main horizontal side frames of the automobile.

The water tank or container 10 is usually suspended from the main side members of the frame of the automobile. The legs 17 are provided on the hanger strap 15, for the purpose of extending over the top of the main side frame member and these legs are secured to said frame by means of bolts (not shown) which pass through the holes 18 in the members 17 and through complementary holes (not shown) provided in the frame of the automobile. They are thus securely attached to the automobile and the tank is suspended in a concealed position underneath the automobile. The bottom of the tank is raised sufficiently so that it is higher than the lowest depending part of the automobile. It is concealed between the grill and the radiator of the automobile and cannot be easily seen from the exterior of the automobile unless the observer looks underneath the car from a low level.

A noise deadening strip 19 is provided on the upper, outer edge of the water tank 10, for the purpose of preventing the tank from rattling against the grill of the automobile, and to deaden vibration noises created by the tank itself. This noise deadening strip may be made of rubber, fiber, cork or any other suitable sound muffling or deadening material.

The impeller pump 20 is preferably positioned within the water tank 10 so as to rest on the bottom of the tank. Intake openings to the pump housing 24 are arranged at or near the floor of the tank, so that water will be picked up from the tank and circulated until the tank is almost empty. This pump may be of conventional impeller type, having an impeller (not shown) with a housing 24 thereabout, so that the impeller, as it turns, creates a pressure against the housing wall and forces water out through the discharge outlet 23.

The shaft 21, which drives the impeller, extends upwardly through the shaft housing and pump support 22, and the said shaft is connected to and rotated by the electric motor 25.

The flange 26 is provided on the motor 25, for the purpose of securing the motor to the water tank 10. It is secured to the tank by means of screws 27 passing through the flange 26 and into the tank. The motor 25 could be hermetically sealed and concealed within the tank.

The motor 25 may be a conventional D. C. motor, of correct voltage, to be driven by the battery on the automobile with which it is used. In most automobiles a six volt D. C. motor is sufficient for the requirements of this invention.

Current is supplied to the pump motor by the automobile battery. Electrical lead 29 connects the pump motor 25 with the positive terminal of the battery through the switch 30, which switch is located on the dashboard of the automobile. The other side of the motor is grounded to the chassis of the automobile by means of the ground wire 28. This electrical circuit is used on automobiles or vehicles wherein the negative terminal of the battery is grounded and the chassis of the vehicle is used for one side of the electrical circuit. Of course, the wiring would be changed to adapt it to a vehicle wherein the chassis is not used for one side of the electrical circuit.

The switch 30 is preferably a multiple position switch, whereby varying resistances can be switched into the circuit to vary the speed of the pump motor and thereby vary the amount of water circulated by the pump. In ordinary practice this switch would be a three-position switch to provide for three different speeds in the electric motor. The amount of evaporation, and the amount of water required to be circulated will vary with the speed at which the automobile is driven. This is so because the amount of air picked up by the induction scoops and passed through the ventilator ducts varies with the speed of the automobile. Therefore, at slower vehicle speeds the pump should be slowed down and at higher speeds it should be speeded up. Thus a variable speed switch is very advantageous. However, the switch may be a simple one-position switch, to allow for only one speed of the motor.

The tube 31 is connected to the impeller housing outlet 23 and to the tube 33 through the elbow joint 32. The tube 33 extends upwardly through the shell of the water tank 10 and is connected to one leg of the T connection 34. A copper tube or rubber hose may be used instead of the tubes 31 and 33 and the fitting 32, if preferred.

The conduits 35 lead from the other two outlets of the T connection 34 and the outer ends of such conduits pass through the sides of the induction scoops 40 and are connected to the dispersing pipes 36, on the interior of the induction scoops 40. The ends of the dispersing pipes 36, opposite the connection with the conduit 35, are closed by a removable cap 37, or by other suitable means, so that water discharged into the dispersing pipes 36 by pressure from the pump will be forced to pass through the holes or perforations 38 in the dispersing pipes. The cap 37 may be removed to permit flushing of the pipe 36. This could also be accomplished by a removable screw plug in the end of pipe 36.

There are a plurality of perforations or holes 38 in the dispersing pipes 36, which are provided at spaced intervals along the length thereof and are in sufficient number and location to disperse water over the entire face of the evaporator pads 60, when water is circulated therethrough.

The induction scoops 40 are preferably made of light metal such as tin-coated iron, aluminum or light sheet steel. They assume substantially the shape of a frustum of a cone, the end having the larger diameter being disposed outwardly, and the rear opening thereof being of substantially the same diameter as the ventilation duct found on the automobile, or the ventilation duct which is installed on the automobile.

A visor 41 is provided to extend from the upper side of the induction scoop 40 for the purpose of preventing air entering the scoop and water discharged by the dispersing pipe 36 from going over the top of the induction scoop. In the absence of such visor or hood 41, the upward pressure of the air entering the front grill of a moving automobile at a point lower than the induction scoop would blow some of the water emitted from the dispersing pipe over the top of the induction scoop. Also a large amount of the air would go over the top of the scoop. The visor 41 deflects the water and air into the scoop.

An outwardly turned flange 42 is provided on the rear of the induction scoops 40, and is secured to the induction scoop by means of the weld 43. The flange 42 is secured to the supporting plate 45 by means of the bolts 46. The bolts 46 pass through the flange 48 on the outer side of the ventilation duct 50, the supporting plate 45, and the flange 42, and are secured in place by means of the nuts 47 threaded thereon. The flange 48 is secured to the induction scoop 50 by means of the weld 49.

The supporting plate 45 is usually a part of the automobile, in that it is a plate secured between the side of the radiator and the wheel housing of the automobile.

The ventilation ducts 50 are ordinarily standard equipment on late model automobiles and are installed at the factory. However, these ducts could be installed on any automobile or other vehicle and thus provided for attachment of my invention.

My air conditioner would operate satisfactorily with only one duct 50. Only one scoop 40 would be necessary in such event and thus the cost of the air conditioning unit would be materially reduced. Less water would be consumed and the automobile could be driven much further without refilling the tank. The air conditioner is illustrated in the drawings with two ducts and two scoops for the simple reason that most late model automobiles are already provided with the two ducts.

When joined together the induction scoop 40 and the duct 50 form one continuing air duct from the outside of the vehicle to the interior of the automobile, with an evaporator pad positioned therein.

The ducts 50 are secured to the partition 53, which position separates the interior of the automobile from the engine compartment, each duct 50 being provided with a flange 51. Flange 51 is secured to partition 53 by means of bolts (not shown) passing through the holes 52 in the flange 51. The flange 51 is positioned on the side of partition 53 which faces to the engine compartment.

The ventilation duct 50 opens into the passenger compartment of the automobile through an opening 54 provided in the partition 53.

The opening 54 may have a butterfly louver 55 arranged therein to turn about the pivot 56. Such a louver is provided for the purpose of regulating the amount of air passing through the duct 50 and entering the automobile, and the setting thereof is controlled by a rod operated lever or cable (not shown) controlled from the instrument panel. This type of louver is ordinarily provided as standard equipment with ducts installed on the automobile at the factory. However, they may be attached on any type of vehicle at the time the ducts 50 are arranged thereon to provide for the installation of my air conditioner. Other types of louvers may also be employed, such as pivoted, slatted louvers, which may be adjusted to control the amount of air entering the automobile.

The opening from duct 50 into the automobile may be provided with a tubular extension 57, to which the adjustable tubular extension 58 is attached by means of a universal joint 59. By such provision the air entering the automobile through the duct 50 may be diverted in selected directions by turning the adjustable extension 58 about the universal joint 59. Numerals 58a, 58b and 58c are illustrative of positions to which the extension 58 may be turned. This provision may be particularly useful where only one duct is installed on the automobile or when only one duct is used with my air conditioner. In such event the cooled or conditioned air entering the automobile through the single duct may be directed upwardly and deflected from the ceiling of the automobile so that it will cool the entire automobile. It may be equally useful for such purpose where there are two ducts on the automobile.

The evaporator pad 60 may be made of excelsior, shavings, spun glass, or any other suitable material customarily used for evaporator pads in evaporative coolers. The evaporator material is secured between two layers of hardware cloth 61 and 62. This hardware cloth is preferably galvanized or copper and of a coarse mesh. The pieces of hardware cloth with the evaporator pad therebetween are, of course, cut to conform to the interior surface of the scoop 40. The bolt 63, of which there may be one or more, passes through the hardware cloth and the evaporator pad to hold them together. The bolt 63, also passes through the inwardly turned flange of the pad retaining lug 65, and is secured thereto by means of a nut 64 threaded thereon. The back wire 62 could be soldered in position in the scoop, thereby making it unnecessary to remove same when the pad 60 is changed.

The pad retaining lug 65 is removably secured to the shell of the air scoop 40 by means of the screw 66. There is one of these pad retaining lugs 65 on each side of the evaporator pad to thereby hold the evaporator pad in the induction scoop 40. The evaporator pad 60 may be easily removed and replaced by a new pad by the simple expedient of removing the lugs 65.

It will be necessary to periodically change the evaporator pad 60, since it will become filled and stopped with dirt, trash, and insects strained out of the air picked up by the scoops 40. The water retaining material may become rotted after a period of use, or become of bad order, and such troubles are quickly remedied by installing replacement pads.

The dispersing pipe 36 is removably secured in the upper side of the scoop 40 by means of a clip 67, the inner leg of which clip conforms to the periphery of the dispersing pipe 36 and supports it. Such clip is secured to the inner side of the scoop body by means of the screw 68. There may be one of these clips 67 at each end of the dispersing pipe, to thus securely hold it in place, but the clips are removable so that the dispersing pipe may be removed for replacement or for the purpose of cleaning it out and opening up the holes 38 therein, which may become clogged by sediment or trash in the water discharged therethrough.

The lip or baffle 70, extending upwardly from the lower side of the induction scoop 40, serves a double purpose. It serves the purpose as a water retaining lip to collect water running down the sloping bottom 44 of the scoop 40, and through the pressure-free return duct 73, into the return pipe or drain 75, and it prevents water from being wasted or spilled out of the end of the scoop 40. The lip 70 also serves the purpose of an air baffle which prevents air from directly striking the area of discharge port 74, behind the lip 70, when the automobile is in forward motion. The discharge area behind the lip 70 is in effect in partial vacuum when the car is in forward motion in that the pressure of air entering above the lip 70 is much greater than the pressure in the shielded area behind the lip 70. Therefore, water returning through the pressure-free return duct 73 to the area behind the plate 70 will in effect be drawn into such area by the differential in pressure.

A screen or strainer 72, has one side secured to the upper side of the lip 70 and the other side secured to the lower wall 44 of scoop 40, and is positioned across the discharge area behind the lip or baffle 70, to strain dirt, trash and insects out of the water returning to the tank 10.

The pressure-free return tube 73 is secured to the lowest point on the interior of the scoop 40 and the inner end thereof extends through the pad 60 and communicates with the area behind the pad 60 and the outer end thereof extends through or below the screen 72 and terminates at the discharge port 74. This pressure-free return duct 73 is provided so that water behind the evaporator pad 60 may freely return to the discharge port 74 and through the return pipe 75 to the tank, from which it is re-circulated and reused. If such a duct were not provided, the pressure of the air entering the scoop body would push the water behind the evaporator pad 60 and force it backward and upward and thus keep it from returning to the discharge port 74, and it would thus accumulate in the scoop 40. Such accumulation would cause droplets of water and spray to be blown back through the ventilation duct 50 into the interior of the car. By providing the tube or duct 73, the water returning therethrough to the discharge port 74 is protected from the pressure of air entering the scoop and thus returns to the tank. As explained above, the differential in pressure between the opposite ends of the tube 73 in effect causes the water to be sucked into the discharge area behind the lip 70. This not only prevents spray and droplets of water from entering the car but it conserves water. It eliminates any wastage of water, and the only water used is that lost by evaporation.

It will be noted that the bottom side 44 of the induction scoop 40 gradually slopes forward while the top side thereof is practically horizontal. This sloping side facilitates the running of the unevaporated water back to the discharge drain opening 74 and it is thereby returned to the tank for recirculation.

The water return tube 75 causes communication between the air scoop and the tank, thereby returning water to the tank after it has accumulated in the scoop 40. The tube 75 is secured to the lower side of the scoop 40 by means of a weld 76.

Means and forms of attachment shown in the drawings and set out in this specification may have substituted therefor other suitable means and forms; and the same is true of the tubes, pipes, conduits and ducts disclosed.

The operation and function of my invention may be described as follows:

It is placed in operation by closing the switch 30 on the instrument panel of the automobile thereby energizing the pump motor 25. The pump motor 25 turns the impeller pump 20 and the water is circulated by the impeller pump through the outlet 23, tube 31, elbow joint 32, conduit 33, T 34, and tubes 35 into the dispersing pipes 36. Pressure of the pump forces the water through the holes or perforations 38 in the dispersing pipe 36 and the water flows in tiny streams in front of the pad 60 and saturates it as the wind entering the scoop disperses the water over and through the pad. The forward motion of the automobile causes relatively warm air to enter the scoops 40 and pass through the pad 60 and thus evaporate the moisture therein, thereby cooling the air before it passes through the ducts 50 into the automobile.

Ordinarily, more water will be discharged through the discharge ports 38 than can be absorbed by the pads and evaporated. This excess water will fall to the bottom of the scoop 40 and will run back into the tank 10 through the return pipe 75, in the manner hereinbefore described, and it is thereafter recirculated.

If desired, a medicament, disinfectant, deodorant or inhalant may be mixed with the water in the tank 10 to provide a pleasant odor in the automobile or to relieve hay fever, asthma, colds or other ailments of the occupants of the car. For this purpose the device may be used in winter as well as in summer.

The device may also be used in the winter for the purpose of periodically supplying moisture within the automobile when the heater has been used to the extent that it dehumidifies the air within the automobile.

This device not only acts as an air cooler, but it may be used to strain, wash, and filter all air entering the car so that the air breathed by the occupants is free of dust, pollen and other irritating substances and particles found in the outside air. It would especially be advantageous for persons suffering from hay fever in that it would remove dust and pollen from the air entering the automobile. For this purpose it may be used in all seasons. By closing all windows of the automobile and forcing all air entering the car through the pad 60, then all air entering the car is washed, cleaned and filtered.

This device may also be adapted for use as a windshield washer. This may be accomplished by merely extending a tube or conduit from the discharge pipe 33 to the customary openings for a windshield washer on the outer side of the windshield. The discharge of the windshield wiper may be controlled by a valve located on the instrument panel of the automobile so that when it is desired that the windshield be washed, the switch 30 may be closed, energizing the pump 25, and the valve controlling the windshield wiper tube may be opened so that water is pumped from the tank through the windshield wiper line and discharged on the outer faces of the windshields to thereby wash them. This would be a particularly good windshield washer in that considerable pressure is supplied by the pump to the water discharged on the windshield. This pressure is not supplied in the presently known or conventional windshield washers.

It is to be understood that I have shown and described only a preferred embodiment of my invention, and that other and further forms thereof may be devised and made without departing from the spirit and scope of the appended claims.

I claim:

1. In an air conditioner adapted to be attached to an automotive vehicle having a ventilation duct thereon; a water container; an air scoop adapted to be positioned on the outer end of said ventilation duct; an evaporator pad positioned across said scoop; a water delivery duct arranged above said pad and adapted to deposit water on said pad; a water circulator in said container; power means to operate said water circulator; a conduit extending from said circulator to said delivery duct; a return duct extending from said scoop to said container; a duct positioned in said scoop and providing communication between the area behind the evaporator pad and the area of the return conduit outlet whereby unevaporated water returning to said return conduit from behind the evaporator pad may be isolated from the incoming pressure of air entering the air scoop; and a lip extending across the lower front end of said scoop, whereby the area of the return conduit outlet is baffled from the pressure of incoming air.

2. In an air conditioner adapted to be attached to an automotive vehicle having a ventilation duct thereon, a water container; an air scoop adapted to be positioned on the outer end of said ventilation duct; an evaporator pad positioned across said scoop; a water delivery duct arranged above said pad and adapted to deposit water on said pad; a water circulator in said container; power means to operate said water circulator; a conduit extending from said circulator to said delivery duct; a return conduit extending from said scoop to said container; a duct positioned in said scoop and providing communication between the area behind the evaporator pad and the area of the return conduit outlet, whereby unevaporated water returning to said return conduit from behind the evaporator pad may be isolated from the incoming pressure of air entering the air scoop; a lip extending across the lower front end of said scoop, whereby the area of the return conduit outlet is baffled from the pressure of incoming air; a strainer extending from said lip to the bottom of said scoop across the area of the return conduit to strain water returning to the return conduit.

3. In an air conditioner adapted to be attached to an automotive vehicle having a ventilation duct thereon, a water container; an air scoop adapted to be positioned on the outer end of said ventilation duct; an evaporator pad positioned across said scoop; a water delivery duct arranged above said pad and adapted to deposit water on said pad; a water circulator in said container; power means to operate said water circulator; a conduit extending from said circulator to said delivery duct; a return conduit extending from said scoop to said container; a duct positioned in said scoop and providing communication between the area behind the evaporator pad and the area of the return conduit outlet, whereby unevaporated water returning to said return conduit may be isolated from the incoming pressure of air entering the air scoop; a lip extending across the lower front end of said scoop, whereby the area of the return conduit outlet is baffled from the pressure of incoming air; a visor extending from the top front end of the said scoop to prevent water from being blown over the top of the said scoop by the pressure of the incoming air.

4. In an air conditioner adapted to be attached to an automotive vehicle having a ventilation duct thereon, an induction scoop comprising a shell adapted to be attached to the inlet of the ventilation duct; a water return outlet leading from the bottom side of said shell; a baffle wall extending across the lower outer end of said shell and shielding the return outlet from the pressure of the incoming air; an evaporator pad positioned across said shell; a dispersing conduit positioned above said pad and adapted to deposit water thereon; a pressure free return conduit communicating with the area behind said evaporator pad and the area of the return outlet; and a visor extending from the upper front end of the said shell.

References Cited in the file of this patent

UNITED STATES PATENTS

| Number | Name | Date |
| --- | --- | --- |
| 2,124,137 | Christian | July 19, 1938 |
| 2,189,391 | Bowdish | Feb. 6, 1940 |
| 2,237,497 | Munford | Apr. 8, 1941 |
| 2,277,552 | Kneedler | Mar. 24, 1942 |
| 2,322,110 | Bock | June 15, 1943 |
| 2,391,408 | Galamb et al. | Dec. 25, 1945 |
| 2,435,798 | Rice et al. | Feb. 10, 1948 |
| 2,495,538 | Mousel | Jan. 24, 1950 |
| 2,587,197 | Mousel | Feb. 26, 1952 |

FOREIGN PATENTS

| Number | Country | Date |
| --- | --- | --- |
| 670,408 | Germany | Jan. 18, 1939 |